United States Patent
Sanders

(10) Patent No.: US 7,685,333 B2
(45) Date of Patent: Mar. 23, 2010

(54) METHOD AND SYSTEM FOR COMMUNICATING WITH MEMORY DEVICES UTILIZING SELECTED TIMING PARAMETERS FROM A TIMING TABLE

(75) Inventor: Richard Sanders, Hutto, TX (US)

(73) Assignee: Sigmatel, Inc, Austin, TX (US)

( * ) Notice: Subject to any disclaimer, the term of this patent is extended or adjusted under 35 U.S.C. 154(b) by 423 days.

(21) Appl. No.: 11/085,995

(22) Filed: Mar. 22, 2005

(65) Prior Publication Data

US 2006/0217865 A1 Sep. 28, 2006

(51) Int. Cl.
 G06F 3/01 (2006.01)
 G06F 13/00 (2006.01)
 G06F 11/36 (2006.01)

(52) U.S. Cl. .............................. 710/33; 710/62; 710/12; 710/15

(58) Field of Classification Search ...................... 710/8, 710/106, 3; 711/103; 370/493, 468; 326/86; 716/6, 1, 10; 703/14, 19; 709/227
 See application file for complete search history.

(56) References Cited

U.S. PATENT DOCUMENTS

| | | | | |
|---|---|---|---|---|
| 5,168,493 A * | 12/1992 | Nelson et al. | ............... | 370/314 |
| 5,479,447 A * | 12/1995 | Chow et al. | .................. | 375/260 |
| 5,726,918 A * | 3/1998 | Giramma et al. | .............. | 703/14 |
| 6,246,694 B1 * | 6/2001 | Chen | ........................... | 370/468 |
| 6,574,012 B1 * | 6/2003 | Kagawa | ...................... | 358/434 |
| 6,675,215 B1 * | 1/2004 | Cedola | ........................ | 709/227 |
| 6,820,231 B2 * | 11/2004 | Lee et al. | ..................... | 714/781 |
| 6,911,843 B2 * | 6/2005 | Mizumoto et al. | ............ | 326/86 |
| 6,993,605 B2 * | 1/2006 | Fabre | ........................... | 710/60 |
| 7,000,020 B2 * | 2/2006 | Cedola | ........................ | 709/227 |
| 7,020,073 B2 * | 3/2006 | Kadous et al. | .............. | 370/208 |
| 7,031,345 B1 * | 4/2006 | Haber | ........................ | 370/493 |
| 7,054,983 B2 * | 5/2006 | Mizokuchi et al. | .......... | 710/305 |
| 7,079,445 B2 * | 7/2006 | Choi et al. | ............. | 365/189.02 |
| 7,272,665 B2 * | 9/2007 | Yamada et al. | .................. | 710/3 |
| 7,333,536 B2 * | 2/2008 | Sinha et al. | .................. | 375/225 |
| 2003/0051086 A1 * | 3/2003 | Smith et al. | ................. | 710/106 |
| 2003/0097520 A1 * | 5/2003 | Lai et al. | ..................... | 711/103 |
| 2005/0005227 A1 * | 1/2005 | Felbecker et al. | ........... | 714/776 |
| 2005/0081171 A1 * | 4/2005 | Kawano et al. | ................. | 716/6 |
| 2005/0149640 A1 * | 7/2005 | Hosokawa | ...................... | 710/8 |
| 2006/0031808 A1 * | 2/2006 | Toyoda | ........................ | 716/18 |
| 2006/0217865 A1 * | 9/2006 | Sanders | ........................ | 701/60 |
| 2008/0043773 A1 * | 2/2008 | Ihori | .......................... | 370/460 |

OTHER PUBLICATIONS

Universal Serial Bus Specification, Apr. 2000, pp. 25, 29, 37, 40-41.*

* cited by examiner

Primary Examiner—Henry W. H. Tsai
Assistant Examiner—Cheng-Yuan Tseng
(74) Attorney, Agent, or Firm—Toler Law Group

(57) ABSTRACT

A computational system is disclosed. The computational system includes a controller having a table including a plurality of sets of timing parameters. The plurality of sets of timing parameters are ordered based on a speed rate. The computational system also includes a device accessible to the controller. The controller communicates with the device in accordance with one set of timing parameters selected from the plurality of sets of timing parameters.

13 Claims, 3 Drawing Sheets

METHOD AND SYSTEM FOR COMMUNICATING WITH MEMORY DEVICES UTILIZING SELECTED TIMING PARAMETERS FROM A TIMING TABLE

FIELD OF THE DISCLOSURE

This disclosure, in general, relates to methods and systems for communicating with memory devices.

BACKGROUND

Increasingly, consumers are demanding portable devices, such as personal digital assistants (PDA's), MP3 players, portable memory systems, advanced cell phone systems and cameras. Traditional non-volatile memory storage systems, such as floppy disks, hard drives, and optical drives are generally unsuitable for use in portable devices because they suffer from mechanical failures, excess weight, large size and high energy consumption. As a result, manufacturers of portable devices are turning to solid-state memory systems, such as flash memory and electrically erasable, programmable read-only memory (EEPROM). Similarly, other computational systems rely on solid-state memory devices and other specialized circuitry.

Each of these memory devices and other specialized circuitries operates and communicates in accordance with a particular set of timing parameters. A host device generates timed signals based on a clock signal and the set of timing parameters for communicating with the memory device or other circuitry. For example, memory devices utilize specific timing signals for data transfer, block erasing, and resetting. However, owing to the variability in semiconductor processing, devices having the same design are capable of operating at different rates.

Typically, a manufacturer of a device sets the timing parameters based on the lowest acceptable rate achieved by a set of devices. As such, many devices in any given set are capable of operating at rates faster than the rate specified by the manufacturer.

When connected to a system, controllers are provided with the manufacturer specified timing parameters and the devices are accessed in accordance with those timing parameters. For example, a controller may include a table having an entry that includes a device number and a set of timing parameters associated with a device represented by the device number. For large systems, the table is large, including 50 to 100 entries and occupying excess space within the controller. When accessing the device, the controller accesses the table, finds the device number entry and implements communications for access to the device using the timing parameters included in that entry.

In another method, the controller may include a single set of device timing parameters with which it accesses connected devices. In practice, such a set of timing parameters is the timing parameter set associated with the slowest device connected to the controller. As such, improved systems and methods for accessing and communicating with devices would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWING(S)

In one particular embodiment, the disclosure is directed to a computational system including a host device or controller and one or more devices accessible to the controller. The controller has a table including sets of timing parameters. In one embodiment, the controller communicates with one of the devices in accordance with one set of the timing parameters. In a particular embodiment, the table does not include device identifications associated with the sets of timing parameters and may consist essentially of the sets of timing parameters. The table may be a soft data table and, in one example, the sets of timing parameters are ordered based on rate or speed. For example, the sets of timing parameters may be ordered from slowest to fastest. In one embodiment, the device is a memory device, such as a solid-state flash memory device.

In another exemplary embodiment, the disclosure is directed to a method for controlling or communicating with one or more devices. The method includes selecting a set of timing parameters from a table including sets of timing parameters, such as a table consisting essentially of the sets of timing parameters. In one exemplary embodiment, the sets of timing parameters are ordered from slowest to fastest. The method may further include communicating with one or more devices based on a set of timing parameters and determining an error rate associated with the communication. When the error rate is acceptable, a next fastest set of timing parameters is selected. However, when the error rate is unacceptable, the next slower set of timing parameters is selected. As such, the controller dynamically determines a preferred set of timing parameters for communicating with the device.

Figure 1:
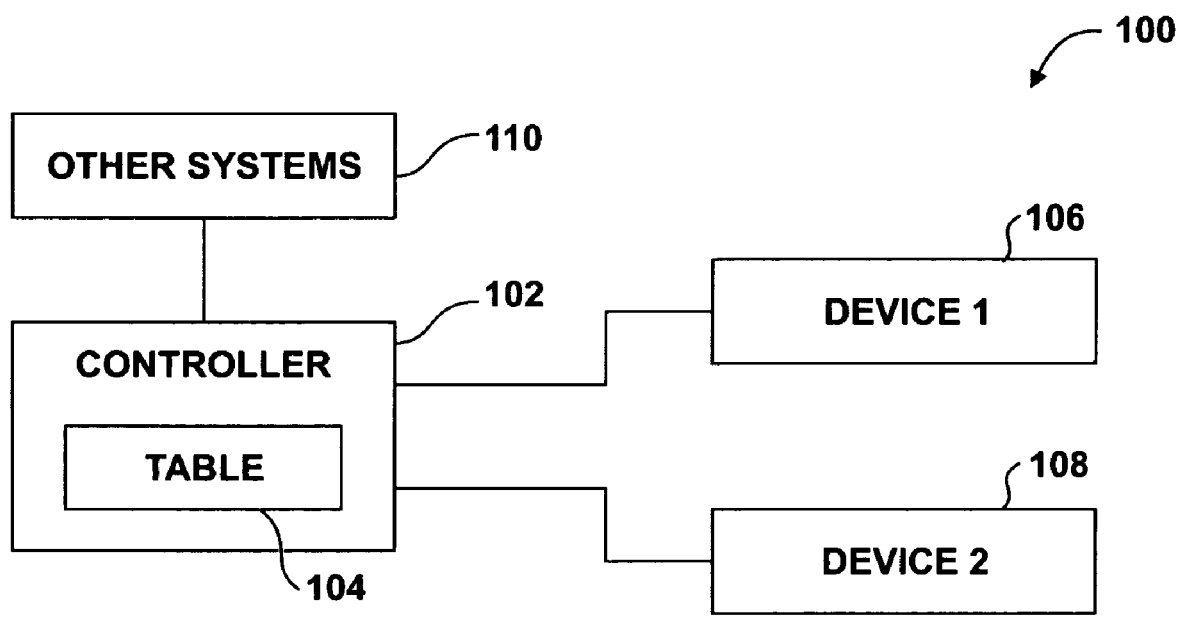
FIG. 1 includes an illustration of an exemplary computational system.

FIG. 1 includes an illustration of an exemplary computational system 100. The computational system 100 includes a controller 102 connected to one or more devices 106 and 108. The controller 102 may be coupled to devices 106 and 108 directly or through a data bus. In the particular example illustrated, the controller 102 is also coupled to other systems 110, such as through a data bus.

In one particular embodiment, the devices 106 and 108 are memory devices. For example, the device 106 may be a solid-state memory device, such as a flash memory device. In one particular embodiment, the device 106 is a NAND flash memory device.

The controller 102 includes a table 104, which includes sets of timing parameters. The sets of timing parameters may be stored in an ordered configuration in accordance with a speed or rate associated with individual sets of timing parameters. In one particular embodiment, the table does not include device identifiers associated with the sets of timing parameters. For example, the table 104 may consist essentially of the ordered sets of timing parameters. In one embodiment, table 104 is a soft table. Alternatively, the table 104 is a hardware-based table.

The controller 102 communicates with the devices, such as devices 106 and 108, in accordance with particular sets of timing parameters. The timing parameters may, for example, include parameters for programming, reading, and erasing data. Timing parameters include hold times, setup times, pulse widths and access times associated with particular operations, such as writing, reading, and erasing data. In one exemplary embodiment, timing parameters associated with reading data include a pulse width time and a hold time. The table 104 may include pairs of timing parameters that are ordered based on the value of the parameters, such as largest pulse width and hold times to smallest pulse width and hold times. Exemplary embodiments of the controller 102 may include more than one table, wherein each table includes parameters associated with a particular operation, such as reading data or writing data. The controller 102 may further include pointers wherein each pointer is associated with a device and indicates a location within a table storing timing parameters currently associated with accessing the device. For example, the controller 102 may include a read parameter table and a write parameter table and may include a read parameter pointer and a write parameter pointer associated with a particular device.

In one particular embodiment, the controller 102 selects a set of timing parameters from the table 104, implements those timing parameters in communicating with a device, such as device 106, and determines an error rate based on the communication. If the error rate is acceptable, the controller 102 may select a next faster set of timing parameters from the ordered listing of sets of timing parameters. However, if the error rate is unacceptable, the controller may select a next slower set of timing parameters from table 104 and communicate with the device 106 using the next slower set of timing parameters.

Figure 2:
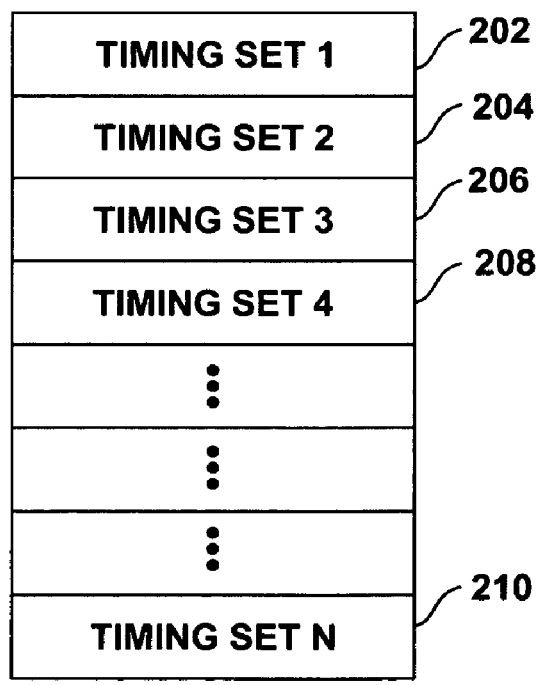
FIG. 2 includes an illustration of a timing table.

FIG. 2 includes an illustration of an exemplary table including sets of timing parameters, such as sets 202, 204, 206, 208 and 210. In one particular embodiment, the sets of timing parameters are ordered from the slowest set, such as set 202, to the fastest set, such as set 210. For example, set 204 may include at least one timing parameter that is faster than the corresponding timing parameter in set 202. In another example, set 204 may be faster overall than set 202. Alternatively, the sets of timing parameters may be ordered from fastest to slowest.

The controller selects a particular set of timing parameters, such as the set 202. The controller communicates with a device utilizing the set of timing parameters and determines an error rate associated with the communications. When the error rate is acceptable, the controller may select a next faster set of timing parameters, such as set 204. For example, the controller may determine over a period of time that the communications error rate is below a threshold. In one embodiment, the threshold may be set so that the communication is essentially error free. After a period of time, the controller may increment to a faster set of timing parameters. For example the controller may increment to set 206 after a period of time over which the error rate is acceptable. When the error rate continues to be acceptable, the controller may increment through the table, such as to set 208, and finally to the end of the table, such as to set 210.

However, when the error rate is unacceptable, for example, when using timing parameters of set 206, the controller may select the next slower set of timing parameters, such as set 204. The controller may continue using the selected next slower set indefinitely or may reinitiate the timing parameter selection process after a period of time. In one particular embodiment, the controller may store a pointer associated with the device to the particular set of timing parameters stored in the timing parameter table. This process may be repeated for each device connected to the controller.

Figure 3:
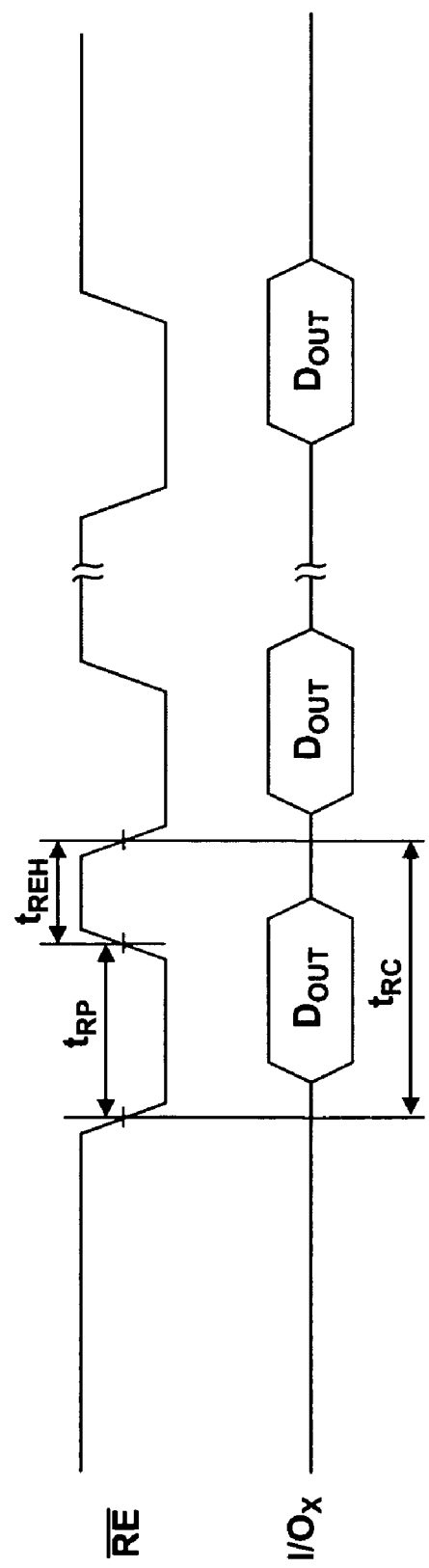
FIG. 3 includes an illustration of a communication with an exemplary storage device.

In one particular example, the timing parameter table includes parameters associated with accessing data on flash storage device. For example, the timing parameter table may include entries having a read enable pulse width (tRP) and a read enable high hold time (tREH). Accordingly, an exemplary table may include ordered sets of parameter pairs, such as a table having entries: {{25,15},{35,15},{45,30}, {60, 50},{80,50}}. FIG. 3 illustrates an exemplary communication utilizing the timing parameters. A controller may access the timing parameter table associated with reading data from data storage devices and retrieve timing parameters from a location within the table associated with accessing data from the particular flash storage device, such as entry {35,15}. The controller communicates with the flash storage device by providing a read enable (RE) signal in accordance with the timing parameters. For example, the controller may send an RE signal in a low state for a period tRP (35 ns), followed by a high state for at least a period tREH (15 ns). If these values result in an error free reading of data from the flash device, the controller may select a faster entry, such as {25,15}. Alternatively, the controller may select a slower entry, such as {45, 30}, when the data has errors.

Figure 4:
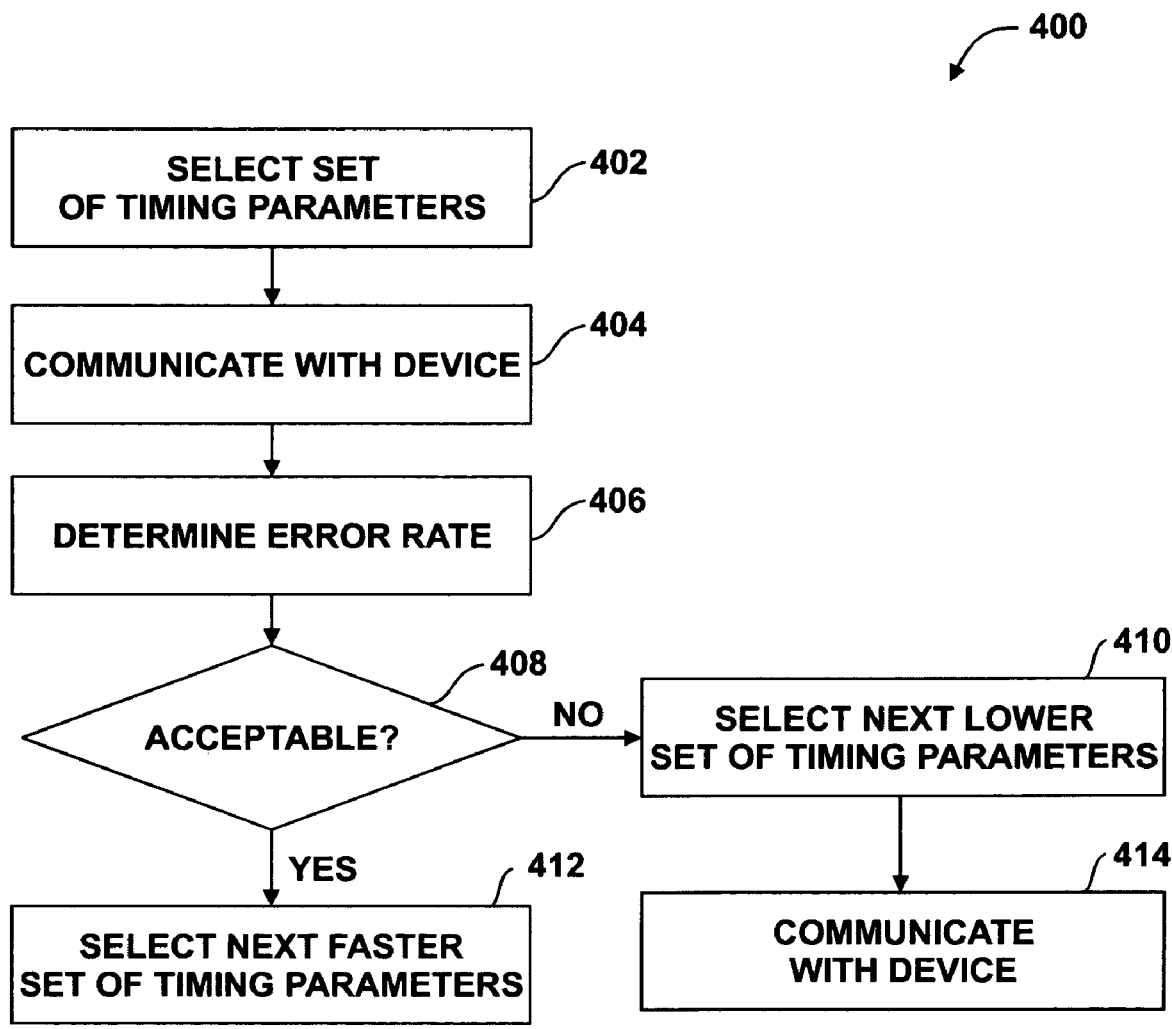
FIG. 4 includes an exemplary method for use in a computational system, such as the computational system illustrated in FIG. 1.

FIG. 4 includes an illustration of an exemplary method for use by a computational system, such as the system illustrated in FIG. 1. The exemplary method 400 includes selecting a set of timing parameters, as illustrated at 402. The controller may, for example, begin by selecting the slowest set of timing parameters from a table having timing parameters associated with a particular operation. In alternative embodiments, the controller may select an intermediate set of timing parameters or the fastest set of timing parameters.

The controller may communicate with a selected device using the selected set of timing parameters, as illustrated at 404. For example, the controller may communicate with a memory device, such as by reading or writing to the memory device. Based on these communications, the controller may determine an error rate, as illustrated at 406. For example, the controller may periodically test data that has been written to and read from an exemplary memory device. In another exemplary embodiment, the memory device may provide an error message to the controller when a command or operation fails.

Based on the error rate, the controller determines whether the error rate is acceptable, as illustrated at 408. For example, when the error rate remains below a threshold for a period of time, the controller may determine that the error rate is acceptable. In one particular embodiment, when the error rate is essentially zero or communications with the device are error-free for a period of time, the controller may determine that the error rate is acceptable.

When the error rate is determined to be acceptable, the controller may select a next faster set of timing parameters, as illustrated at 412. For example, the controller may select the next incrementally faster set of timing parameters from the ordered sets of timing parameters. When the set of timing parameters used to communicate with the device is the fastest set within the ordered sets of timing parameters, the communication device may continue communicating using that particular set of timing parameters. The controller continues communicating with the device, as illustrated at step 404, determines an error rate, as illustrated at 406 and, again, determines whether the error rate is acceptable, as illustrated at 408. When the error rate is acceptable, the controller may select the next faster set of timing parameters, as illustrated at 412.

However, when the controller determines that the error rate is not acceptable, the controller may select the next slower set of timing parameters, such as decrementing to the next lower set of timing parameters in an ordered table of sets of timing parameters. The controller may use the slower set of timing parameters to communicate with the device, as illustrated at 414. In alternative embodiments, the controller may periodically reinitiate the method illustrated in FIG. 4 to determine a preferred set of timing parameters for the device.

For large systems including a large number of devices, particular embodiments of the above-described method and system result in smaller tables of sets of timing parameters than traditional methods. Duplicate sets of timing parameters may be eliminated. In addition, particular embodiments of the above-described method may result in the selection of faster timing parameters than specified by the manufacturer of the device. In this manner, computational systems utilizing particular embodiments of the above-described method and system may benefit from enhanced performance.

In other embodiments, the computational systems may compensate for device degradation and wear. By periodically executing the above-described method, a computational system may adjust for slowing performance of devices over time.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    selecting, at a memory controller, a first set of timing parameters relating to memory control signals from a plurality of sets of timing parameters associated with a particular memory operation in one or more tables at the memory controller;
    communicating with a flash memory device of the computational system by generating memory control signals at the memory controller based on a clock signal and the first set of timing parameters;
    determining, at the memory controller, an error rate associated with communicating with the flash memory device;
    selecting, at the memory controller, a second set of timing parameters relating to memory control signals from the plurality of sets of timing parameters based on the determined error rate, wherein selecting the second set of timing parameters includes selecting a set of timing parameters faster than the first set of timing parameters when the determined error rate is below a threshold, and selecting a set of timing parameters slower than the first set of timing parameters when the determined error rate is above the threshold; and
    communicating with the flash memory device of the computational system by generating memory control signals based on the clock signal and the second set of timing parameters.

2. The method of claim 1, wherein the plurality of sets of timing parameters are stored in an ordered configuration in accordance with a speed associated with each set of the plurality of sets of timing parameters.

3. The method of claim 1, wherein the plurality of sets of timing parameters are stored in an ordered configuration from a slowest speed to a fastest speed.

4. The method of claim 1, wherein at least one of the one or more tables is a soft table.

5. The method of claim 1, wherein at least one of the one or more tables is a hardware-based table.

6. The method of claim 1, wherein each set of timing parameters of the plurality of sets of timing parameters comprise values in units of time.

7. The method of claim 1, wherein the plurality of sets of timing parameters include timing parameters having a read enable pulse width (tRP) and a read enable high hold time (tREH).

8. The method of claim 7, wherein communicating with the flash memory device includes sending a read enable signal in a low state for a period tRP, followed by a high state for at least a period tREH.

9. A method performed at a memory controller of a computational system, the method comprising:
    for each device of a plurality of memory devices of the computational system accessible to the memory controller:
        selecting, at the memory controller, a first set of timing parameters relating to memory control signals from a plurality of sets of timing parameters associated with a particular memory operation in one or more tables at the memory controller;
        communicating with a first flash memory device of the plurality of memory devices by generating memory control signals at the memory controller based on a clock signal and the first set of timing parameters;
        determining, at the memory controller, an error rate associated with communicating with the first flash memory device;
        selecting, at the memory controller, a second set of timing parameters relating to memory control signals from the plurality of sets of timing parameters based on the determined error rate, wherein selecting the second set of timing parameters includes selecting a set of timing parameters faster than the first set of timing parameters when the determined error rate is below a threshold, and selecting a set of timing parameters slower than the first set of timing parameters when the determined error rate is above the threshold; and
        communicating with the first flash memory device by generating memory control signals based on the clock signal and the second set of timing parameters.

10. A computational system comprising:
    a flash memory device; and
    a memory controller including a plurality of sets of timing parameters, wherein the memory controller is operable to:
        select a first set of timing parameters relating to memory control signals from the plurality of sets of timing parameters associated with a particular memory operation in one or more tables at the memory controller;
        communicate with the flash memory device by generating memory control signals based on a clock signal and the first set of timing parameters;
        determine an error rate associated with communicating with the flash memory device;
        select a second set of timing parameters relating to memory control signals from the plurality of sets of timing parameters based on the determined error rate, wherein selecting the second set of timing parameters includes selecting a set of timing parameters faster than the first set of timing parameters when the determined error rate is below a threshold, and selecting a set of timing parameters slower than the first set of timing parameters when the determined error rate is above the threshold; and communicate with the flash memory device by generating memory control signals based on the clock signal and the second set of timing parameters.

11. The method of claim 1, further comprising incrementing to a faster set of timing parameters when the determined error rate remains below the threshold over a period of time.

12. The method of claim 9, wherein each set of timing parameters of the plurality of sets of timing parameters includes hold times that are stored in an order of shortest hold time to longest hold time.

13. A computational system comprising:
a flash memory device; and
a memory controller including a plurality of sets of timing parameters, wherein the memory controller is operable to:
  select a first set of timing parameters relating to memory control signals from the plurality of sets of timing parameters associated with a particular memory operation in one or more tables at the memory controller;
  communicate with the flash memory device by generating memory control signals based on a clock signal and the first set of timing parameters;
  determine an error rate associated with communicating with the flash memory device;
  select a second set of timing parameters relating to memory control signals from the plurality of sets of timing parameters based on the determined error rate, wherein selecting the second set of timing parameters includes selecting a set of timing parameters faster than the first set of timing parameters when the determined error rate is below a threshold; and
  communicate with the flash memory device by generating memory control signals based on the clock signal and the second set of timing parameters.

* * * * *